May 24, 1927.
C. OFFENHAUSER
1,630,071
COOKING AND DRYING APPARATUS
Filed Jan. 19, 1924
2 Sheets-Sheet 1
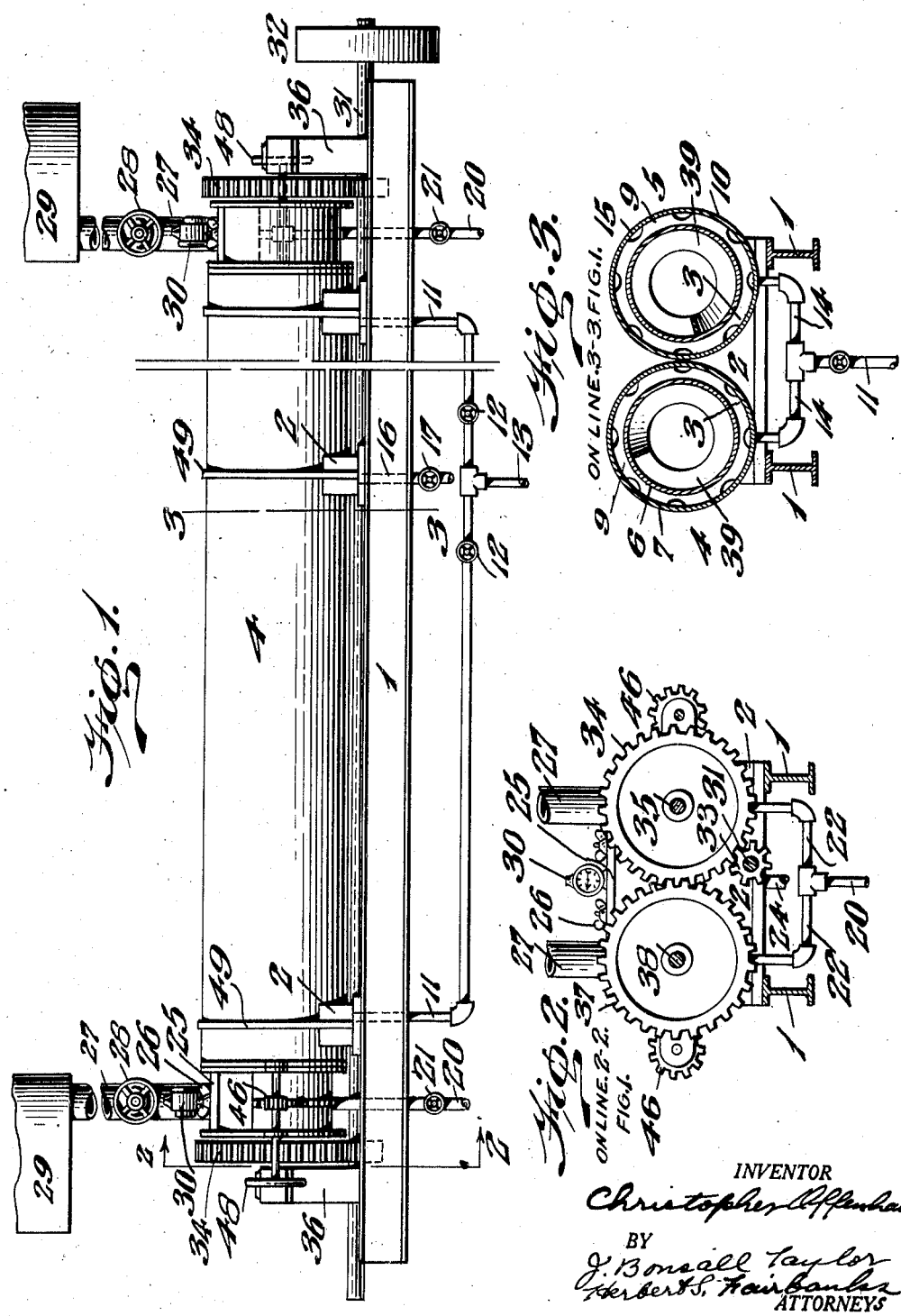
INVENTOR
Christopher Offenhauser
BY
J. Bonsall Taylor
Herbert S. Fairbanks
ATTORNEYS May 24, 1927.
C. OFFENHAUSER
1,630,071
COOKING AND DRYING APPARATUS
Filed Jan. 19, 1924 — 2 Sheets-Sheet 2
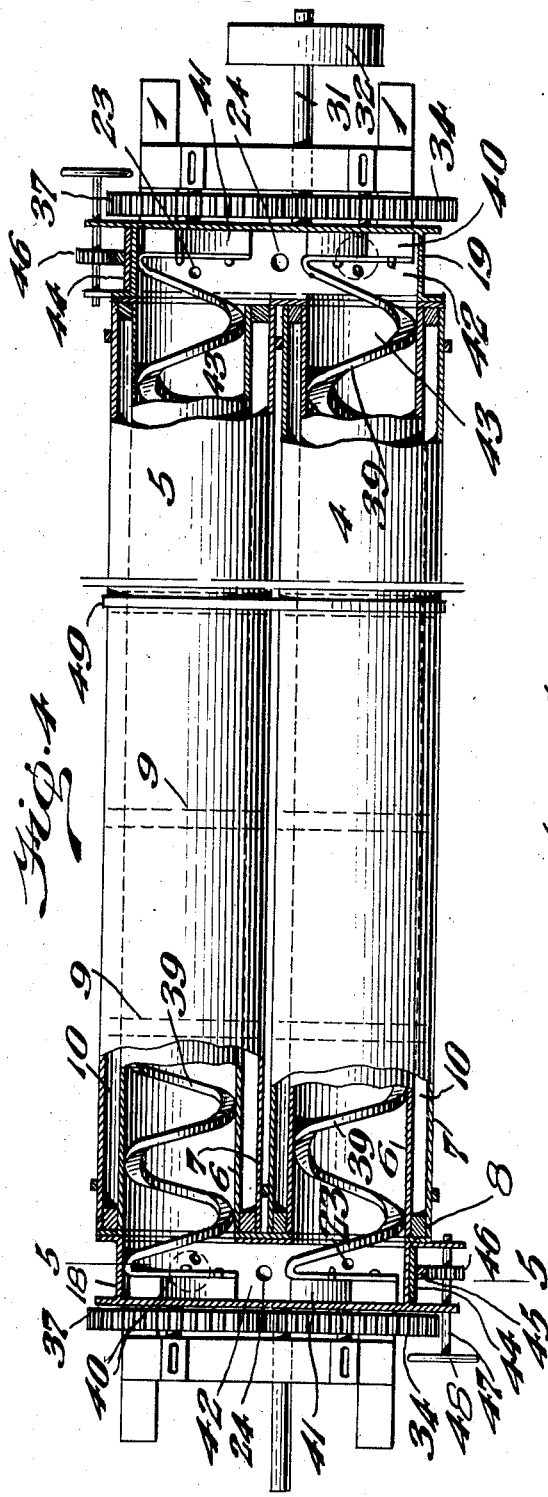
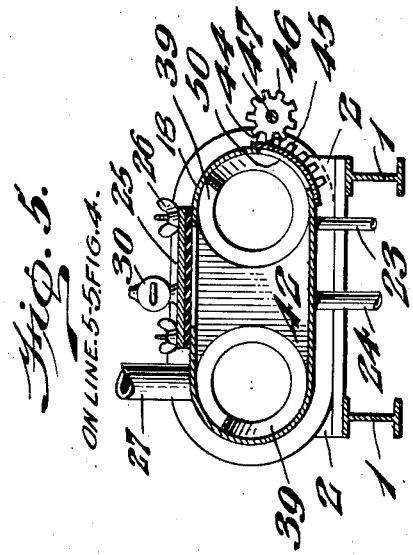
INVENTOR
Christopher Offenhauser
BY
J. Bonsall Taylor
Herbert S. Fairbanks
ATTORNEYS Patented May 24, 1927.

1,630,071

UNITED STATES PATENT OFFICE.

CHRISTOPHER OFFENHAUSER, OF PHILADELPHIA, PENNSYLVANIA.

COOKING AND DRYING APPARATUS.

Application filed January 19, 1924. Serial No. 687,398.

My present invention comprehends a novel construction and arrangement of cooking and drying apparatus wherein the material to be cooked has imparted to it a continuous circulation, and during such circulation the cooking and drying operation may be effected, respectively, by introducing steam into direct contact with the material or by the employment of a surrounding steam jacket.

It further comprehends a novel construction of a casing having a chamber to receive the material, a novel construction of a conveyor to effect the circulation of the material, novel means for effecting the cooking or drying action, and novel means for discharging the cooked or dried material from the machine while the latter is running.

It further comprehends a novel cooking and drying apparatus wherein a plurality of inclosed longitudinally extending chambers are arranged in close proximity to each other and communicate with end chambers; conveying mechanism being provided which effects the circulation of the material through the said chambers, and means being also provided for draining off any liquid matter, when desired.

Other novel features of construction and advantage will hereinafter more clearly appear in the detailed description and the appended claims.

For the purpose of illustrating the invention, I have shown in the accompanying drawing a typical embodiment of it, which in practice, will give reliable and satisfactory results. It is however to be understood that this embodiment is typical only and that the various instrumentalities of which my invention consists can be variously arranged and organized, and that the invention is not limited to the precise arrangement and organization of these instrumentalities as herein set forth.

Figure 1 represents in side elevation a cooking and drying apparatus embodying my invention.

Figure 2 represents a section on line 2—2 of Figure 1.

Figure 3 represents a section on line 3—3 of Figure 1.

Figure 4 represents a top plan view, partly broken away to more clearly illustrate certain features of the construction.

Figure 5 represents a section on line 5—5 of Figure 4.

Similar numerals of reference indicate corresponding parts.

Referring to the drawings:

1 designates the supporting framework of a cooking and drying apparatus embodying my invention, and, as illustrated, it consists of structural beams which support the cradles 2. The cradles 2 are recessed as at 3 in order to conform to the contour of the bottoms of the casings 4 and 5, each of which consists of an inner casing 6 and an outer casing 7 which are spaced from each other by means of spacing rings 8 and 9, see Figures 3 and 4, to thereby form steam chambers 10 to which steam is introduced by means of the branch pipes 11, each of which is provided with its controlling valve 12. 13 designates a steam line which leads from a source of steam supply. Each branch line 11 communicates with the branches 14, see Figure 3, which open into their respective steam chamber 10.

The intermediate spacing rings 9 are provided with the recesses 15 in their periphery so that a desired steam pressure can be maintained in the chambers 10, and an exhaust pipe 16 is provided which has a controlling valve 17.

The casings 6 and 7 are connected with end casings 18 and 19 in such a manner as to form a fluid tight joint therewith. Each of the end casings 18 and 19 is adapted to have steam introduced thereinto from a steam line 20, leading from a source of steam supply, and provided with controlling valves 21 and with branch pipes 22, which open into the end casings 18 and 19 through the ports 23. Each end casing, 18 and 19, is also provided with a drainage port 24 which is valve controlled and leads to a desired point of discharge. Each end casing is provided with a removable cover 25, secured in position by means of fastening devices 26. Each cover is provided with one or more conduits 27 which are each provided with a valve 28 and communicate with a condenser 29. Each cover is provided with a combined relief valve and pressure gauge 30. 31 designates the main driving shaft which is provided with a pulley 32 in order to adapt it to be driven by any desired source of power. This shaft 31 has fixed to it the driving pinions 33, which mesh with the gears 34 fixed to a conveyor shaft 35 which is suitably journalled in the bearings 36. The gears 34 mesh with the gears 37 which are fixed to the conveyor shaft 38 which is journalled in the bearings 36. The hubs of the gears 34 and 37 have detachably connected with them the deflected ends of the conveyors 39, one of which is mounted in the casing 4, and the other of which is mounted in the casing 5 so as to effect the feed of the material therethrough. Each conveyor 39 has at one end a flat blade or feed member 40, and at its opposite end a curved blade 41. The blades 40 cause the material to be fed from one side of the chamber 42 in which it is located to the opposite side of such chamber, and the blade 41 cause the material to feed from an end casing into a conveyor chamber 43 in the direction of the feed of the material. The blades 40 are flat blades to feed the material across the chambers 42, while the blades 41 are curved blades so that the material will be fed from the chambers 42 by a curved blade 41 into the juxtaposed chamber 43.

In order to provide for the proper discharge of the treated material from the apparatus, each end casing is provided with a gate, 44, suitably guided, and provided with a rack 45, with which meshes a pinion 46 carried by a rod 47 which is provided with an actuating handle 48. The casings 4 and 5 may be provided, if desired, with the securing straps, 49, and these straps may be connected with the cradles 2 in any desired manner. The operation of my novel cooking and drying apparatus will now be readily apparent to those skilled in this art, and is as follows:

The material to be treated is placed in the chambers 42 of the end casings 18 and 19, and the covers 25 are then clamped in position by means of the fastening devices 26. If the wet method is to be employed in treating the material, steam is introduced through the ports 23 into the material, and, assuming that the driving shaft 31 is being driven, the conveyors 39 will cause the material to be continuously circulated through the end chambers 42 and through the chambers 43 of the casings 4 and 5. As soon as the steam treatment has been continued for a desired length of time, the oil which has been rendered or other liquid may be drawn off through the drainage ports 24, and the treated material may be discharged from the machine through the discharge ports 50 when the gates 44 have been opened. The material can be discharged from one or both ends of the machine.

If the dry method of treating the material is to be employed, steam is introduced into the steam jackets 10, and, as the material passes through the chambers 43, the proper cooking and drying action will be effected, as is apparent.

If desired, both the dry and wet method of treating the material can be employed at the same time, or one be followed by the other. Steam can be admitted into the material through the ports 23, and a desired steam pressure can be maintained within the chambers 10.

In accordance with my present invention, the material is fed through steam jacketed tunnels, so that the temperature is uniform throughout the length of the tunnels. The steam jacket completely surrounds the material so that the loss due to radiation such as occurs when only a portion of the chamber containing the material is subjected to the action of steam, is eliminated.

It will be apparent that the material may be simply dried, or it may be treated for a longer length of time, so that it will be cooked to a desired degree, and, when the desired treatment is completed, the material can be automatically discharged from the machine.

The noxious odors or vapors arising from the cooking or drying operations pass through the conduits 27 to the condensers 29.

My present invention is of special advantage in the treatment of animal matters for the extraction of fat and to reduce scrap or solid material to fertilizer, although it is not limited to such use and can be employed in all cases where it is desired to cook or dry material. The water or liquid fat is drawn off through the drainage ports 24 to a desired place of utilization or of discharge.

One marked advantage of my present invention is that I am enabled to obtain a continuous feed circulation of the material to cause it to travel in an endless path through the end chambers 42 and the chambers 43 so that the material is continuously brought into contact with the inner heated surfaces of the inner casings 6. The cooking or drying operation is obtained with a minimum amount of heat, or, in other words, it is necessary to employ but a minimum amount of steam. The steam pressure within the chambers 10 can be any desired degree of steam pressure.

It will be apparent that in accordance with my present invention the raw material or the material to be treated is placed in the apparatus, which is then sealed up so that there is no chance of any offensive odors or vapors escaping, and the apparatus is maintained in a sealed condition until the desired treatments have been completed and the liquid material withdrawn.

When it is desired to discharge the solid material, all that it is necessary to do is to open the gates 44, as is apparent.

The spacing rings are welded at their outer peripheries to the outer casings and at their inner peripheries to the inner casings of the conveyor casings, so that the necessity of employing stay bolts, with the consequent likelihood of leakage, is eliminated, and the inner and outer casings are properly braced to prevent their buckling or distortion.

It will now be apparent that I have devised a new and useful cooking and drying apparatus which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

I claim:

1. In a cooking and drying apparatus, two steam jacketed cylinders, end members forming chambers of communication between said cylinders, conveyor mechanism to cause the material being treated to continuously circulate through said casings and chambers, drainage conduits communicating with each of said end chambers, and means to introduce steam into said end chambers.

2. In a cooking and drying apparatus, two steam jacketed cylinders, end members forming chambers of communication between said cylinders, conveyor mechanism to cause the material being treated to continuously circulate through said casings and chambers, drainage conduits communicating with each of said end chambers, means to introduce steam into said end chambers, and condensers in valve-control communication with said chambers.

3. In a cooking and drying apparatus, two conveyor casings, each comprising an inner and an outer casing having a steam chamber therebetween and surrounding the inner casing, end casings forming chambers communicating with both of said inner casings, each end casing having at its upper portion a filling opening, and at its lower portion a discharge opening, closures for said openings, conveyors extending through said conveyor casings and into said end casings, means to introduce steam into said steam chambers, and actuating means for said conveyors.

4. In a cooking and drying apparatus, two conveyor casings, each comprising an inner and an outer casing with end and intermediate spacing rings between them to form a steam chamber, the intermediate rings having openings through them, steam inlet and exhaust conduits communicating with said steam chambers, end chambers communicating with both of said inner casings, removable covers for said end chambers, drainage conduits leading from said end chambers, means to introduce steam into said end chambers, and material feeding mechanism in said conveyor casings and end chambers to effect the continuous circulation of material therethrough.

5. In a cooking and drying apparatus, two conveyor casings disposed side by side, open only at their ends and provided with steam jackets entirely surrounding them, means to effect the introduction of steam into and its exhaust from said steam jackets, end members forming chambers in open communication with both of said casings, each end casing having a filling opening at its upper portion and a discharge opening at its lower portion, closures for said openings, conveyors extending through said casings and into said chambers, blades carried by the ends of each conveyor and so arranged as to cause the material in the end casings to feed across such casings and into the juxtaposed conveyor casing, means to introduce steam into contact with the material being treated, and actuating means for said conveyors.

CHRISTOPHER OFFENHAUSER.